(12) United States Patent
Easter

(10) Patent No.: US 7,473,742 B2
(45) Date of Patent: Jan. 6, 2009

(54) LEAD-FREE INSULATION COMPOSITIONS CONTAINING METALLOCENE POLYMERS

(75) Inventor: Mark R. Easter, Indianapolis, IN (US)

(73) Assignee: General Cable Technologies Corp., Highland Heights, KY (US)

( * ) Notice: Subject to any disclaimer, the term of this patent is extended or adjusted under 35 U.S.C. 154(b) by 0 days.

(21) Appl. No.: 11/585,985

(22) Filed: Oct. 25, 2006

(65) Prior Publication Data

US 2007/0100032 A1     May 3, 2007

Related U.S. Application Data

(60) Provisional application No. 60/729,735, filed on Oct. 25, 2005.

(51) Int. Cl.
    *C08C 19/04*      (2006.01)
(52) U.S. Cl. .................... 525/383; 525/387; 524/99; 524/100; 524/86; 524/107; 524/156

(58) Field of Classification Search ............... 524/100, 524/99, 86, 107, 156; 525/383, 387
See application file for complete search history.

(56) References Cited

U.S. PATENT DOCUMENTS 5,719,218 A * 2/1998 Sarma .................... 524/100
6,858,296 B1 * 2/2005 Mendelsohn et al. ........ 428/383

FOREIGN PATENT DOCUMENTS

JP      09-204823     *   8/1997

* cited by examiner

*Primary Examiner*—Ling-Siu Choi
(74) *Attorney, Agent, or Firm*—Blank Rome LLP

(57) ABSTRACT

Novel additive systems for lead-free filled cable insulation are disclosed. These systems provide improved electrical and mechanical properties. The base polymer may be metallocene based, non metallocene based or combinations thereof. The additives may contain one or more hindered amine light stabilizers, mercapto compounds, and optionally, amine antioxidants.

24 Claims, 1 Drawing Sheet

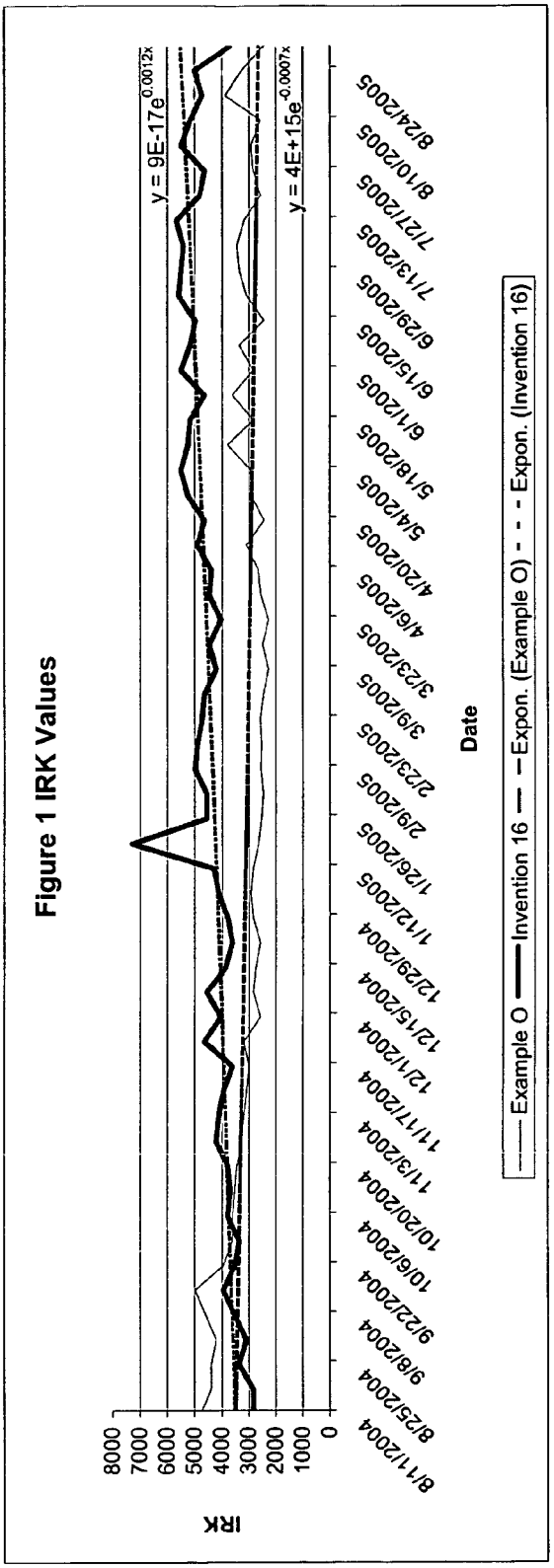
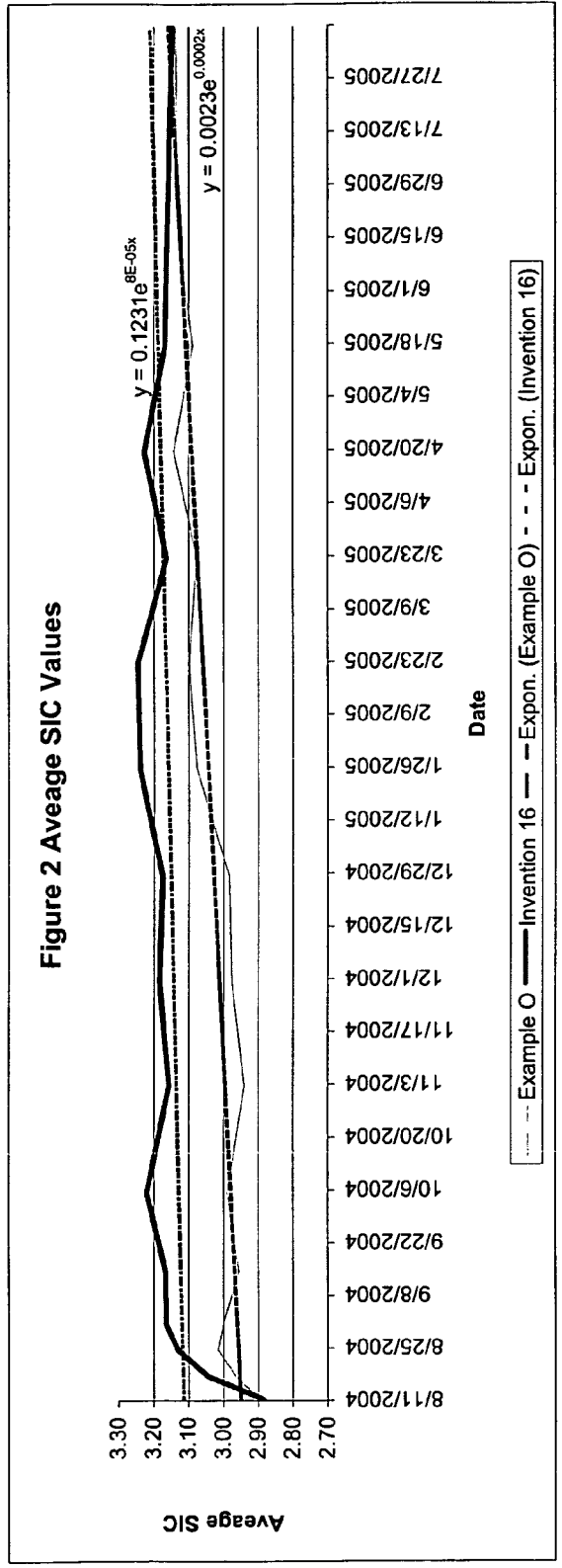

LEAD-FREE INSULATION COMPOSITIONS CONTAINING METALLOCENE POLYMERS

This claims priority under 35 U.S.C. §119(e) to Ser. No. 60/729,735, filed Oct. 25, 2005.

FIELD OF THE INVENTION

The invention relates to lead-free insulation compositions for electric power cables having (a) a base polymer comprising either (i) at least one metallocene polymer, or (ii) at least one non-metallocene polymer or (iii) a combination thereof; (b) a filler; and (c) an additive comprising either (i) at least one hindered amine light stabilizer, or (ii) at least one mercapto compound, or (iii) a combination thereof.

BACKGROUND OF THE INVENTION

Typical power cables generally have one or more conductors in a core that is surrounded by several layers that can include: a first polymeric semiconducting shield layer, a polymeric insulating layer, a second polymeric semiconducting shield layer, a metallic tape shield and a polymeric jacket.

Polymeric materials have been utilized in the past as electrical insulating and semiconducting shield materials for power cables. In services or products requiring long-term performance of an electrical cable, such polymeric materials, in addition to having suitable dielectric properties, must be durable. For example, polymeric insulation utilized in building wire, electrical motor or machinery power wires, or underground power transmitting cables, must be durable for safety and economic necessities and practicalities.

One major type of failure that polymeric power cable insulation can undergo is the phenomenon known as treeing. Treeing generally progresses through a dielectric section under electrical stress so that, if visible, its path looks something like a tree. Treeing may occur and progress slowly by periodic partial discharge. It may also occur slowly in the presence of moisture without any partial discharge, with moisture and discharge, or it may occur rapidly as the result of an impulse voltage. Trees may form at the site of a high electrical stress such as contaminants or voids in the body of the insulation-semiconductive screen interface. In solid organic dielectrics, treeing is the most likely mechanism of electrical failures, which do not occur catastrophically, but rather appear to be the result of a more lengthy process. In the past, extending the service life of polymeric insulation has been achieved by modifying the polymeric materials by blending, grafting, or copolymerization of silane-based molecules or other additives so that either trees are initiated only at higher voltages than usual or grow more slowly once initiated.

There are two kinds of treeing known as electrical treeing and water treeing. Electrical treeing results from internal electrical discharges that decompose the dielectric. High voltage impulses can produce electrical trees. The damage, which results from the application of moderate alternating current voltages to the electrode/insulation interfaces, which can contain imperfections, is commercially significant. In this case, very high, localized stress gradients can exist and with sufficient time can lead to initiation and growth of trees. An example of this is a high voltage power cable or connector with a rough interface between the conductor or conductor shield and the primary insulator. The failure mechanism involves actual breakdown of the modular structure of the dielectric material, perhaps by electron bombardment. In the past much of the art has been concerned with the inhibition of electrical trees.

In contrast to electrical treeing, which results from internal electrical discharges that decompose the dielectric, water treeing is the deterioration of a solid dielectric material, which is simultaneously exposed to liquid or vapor and an electric field. Buried power cables are especially vulnerable to water treeing. Water trees initiate from sites of high electrical stress such as rough interfaces, protruding conductive points, voids, or imbedded contaminants, but at lower voltages than that required for electrical trees. In contrast to electrical trees, water trees have the following distinguishing characteristics; (a) the presence of water is essential for their growth; (b) no partial discharge is normally detected during their initiation; (c) they can grow for years before reaching a size that may contribute to a breakdown; (d) although slow growing, they are initiated and grow in much lower electrical fields than those required for the development of electrical trees.

Electrical insulation applications are generally divided into low voltage insulation (less than 1 K volts), medium voltage insulation (ranging from 1 K volts to 65 K volts), and high voltage insulation (above 65 K volts). In low to medium voltage applications, for example, electrical cables and applications in the automotive industry, electrical treeing is generally not a pervasive problem and is far less common than water treeing, which frequently is a problem. For medium-voltage applications, the most common polymeric insulators are made from either polyethylene homopolymers or ethylene-propylene elastomers, otherwise known as ethylene-propylene-rubber (EPR) or ethylene-propylene-diene ter-polymer (EPDM).

Polyethylene is generally used neat (without a filler) as an electrical insulation material. Polyethylenes have very good dielectric properties, especially dielectric constants and power factors (Tangent Delta). The dielectric constant of polyethylene is in the range of about 2.2 to 2.3. The power factor, which is a function of electrical energy dissipated and lost and should be as low as possible, is around 0.0002 at room temperature, a very desirable value. The mechanical properties of polyethylene polymers are also adequate for utilization in many applications as medium-voltage insulation, although they are prone to deformation at high temperatures. However, polyethylene homopolymers are very prone to water treeing, especially toward the upper end of the medium-voltage range.

There have been attempts to make polyethylene-based polymers that would have long-term electrical stability. For example, when dicumyl peroxide is used as a crosslinking agent for polyethylene, the peroxide residue functions as a tree inhibitor for some time after curing. However, these residues are eventually lost at most temperatures where electrical power cable is used. U.S. Pat. No. 4,144,202 issued Mar. 13, 1979 to Ashcraft, et al. discloses the incorporation into polyethylenes of at least one epoxy containing organosilane as a treeing inhibitor. However, a need still exists for a polymeric insulator having improved treeing resistance over such silane containing polyethylenes.

Unlike polyethylene, which can be utilized neat, another common medium-voltage insulator, EPR, typically contains a high level of filler in order to improve thermal properties and reduce cost. When utilized as a medium-voltage insulator, EPR will generally contain about 20 to about 50 weight percent filler, usually calcined clay, and is preferably crosslinked with peroxides. The presence of the filler gives EPR a high resistance against the propagation of trees. EPR also has mechanical properties which are superior to polyethylene at elevated temperatures.

Unfortunately, while the fillers utilized in EPR may help prevent treeing, the filled EPR will generally have poorer dielectric properties, i.e. a poorer dielectric constant and a poor power factor. The dielectric constant of filled EPR is in the range of about 2.3 to about 2.8. Its power factor is on the order of about 0.002 to about 0.005 at room temperature, which is approximately an order of magnitude worse than polyethylene.

Thus, both polyethylenes and EPR have serious limitations as an electrical insulator in cable applications. Although polyethylene polymers have good electric properties, they have poor water tree resistance. While filled EPR has good treeing resistance and good mechanical properties, it has dielectric properties inferior to polyethylene polymers.

Power factor increases with temperature. In addition it may continue to increase with time at high temperatures. Underwriters Labs MV105 rated cables must be able to survive 21 days at an emergency circuit overload temperature of 140° C. with less than a 10% increase in Dissipation factor. Filled EPR insulations are usually used in these applications.

Another class of polymers is described in EP-A-0 341 644 published Nov. 15, 1989. This reference describes linear polyethylenes produced by a traditional Ziegler-Natta catalyst system. They generally have a broad molecular weight distribution similar to linear low-density polyethylene and at low enough densities can show better tree retardancy. However, these linear-type polymers in the wire and cable industry have poor melt flow characteristics and poor processability. In order to achieve a good mix in an extruder, linear polymers must be processed at a temperature at which the peroxides present in the polymer prematurely crosslink the polymers, a phenomenon commonly referred to as scorch. If the processing temperature is held low enough to avoid scorch, incomplete melting occurs because of the higher melting species in linear polymers having a broad molecular weight distribution. This phenomenon results in poor mixing, surging extruder pressures, and other poor results.

Newer metallocene polyethylene co-polymers are more flexible and have been proposed for use as cable insulation but they also have generally poorer thermal stability, and may deform when exposed to high heat. They also suffer from higher electrical loss with AC current which may be measured by a factor called tan delta.

Polyethylene is the lowest cost insulation polymer for power cables but is the least flexible. Flexibility is desirable for installing cables in confined or limited spaces such as underground ducts, tunnels, manholes and in complex switching stations and transformer banks. EPR and EPDM are the most flexible insulation polymers but are higher in cost. Metallocene EPR, EPDM, ethylene-octenes, and ethylene-butenes have the desired flexibility at a lower cost.

1,2-dihydro-2-2-4 trimethylquinolines or "TMQs" are preferred antioxidants for filled LV, MV or HV cable insulations because of their good thermal degradation protection, low interference with the widely used peroxide cure systems and low cost. TMQs are not used in polyethylene insulation because of their propensity to cause staining.

Hindered amine light stabilizers or "HALS" are primarily used in clear plastic film, sheets or coatings to prevent degradation by light. HALS are used in unfilled polyethylene insulations. They are thought to prevent degradation caused by light emitted by tiny electrical discharges. U.S. Pat. No. 5,719,218 discloses an optically transparent polyethylene insulation formulation with a HAL in combination with a hydrolyzed ethylene vinyl acetate terpolymer. The compositions disclosed are stated to be useful for the prevention of degradation of the insulation by water trees.

EPDM type insulations have excellent resistance to water trees and have been used for over 30 years in AC cable insulations exposed to wet environments. In wet environments the dielectric loss characteristics of an insulation material may be more important to the end user than thermal stability properties. EPDM type insulations are also proven to perform in high temperature service in urban power networks. In these environments thermal stability may be most important to the end user. Filled insulations are opaque so they do not suffer from degradation caused by light emitted by tiny electrical discharges.

Metallocene polymers have shown much higher resistance to water trees than polyethylene but are not widely used as medium or high voltage AC cable insulation due to their higher AC loss, generally poorer thermal degradation resistance and higher cost than polyethylene. Metallocene polymers do have good acceptance of fillers and can be used for flexible, low temperature, low voltage or DC insulations. Unfilled polyethylene compositions such as those disclosed in U.S. Pat. No. 5,719,218 are prone to staining when certain additives such as TMQ are present, as discussed above. WO 02/29829 uses the unfilled polyethylene composition disclosed in U.S. Pat. No. 5,719,218 in an unfilled strippable insulation composition which contains a tetramethylpiperidine hindered amine light stabilizer additive.

Therefore, a need exists in the electrical cable industry for an additive system that improves the performance of filled insulation compositions including those using metallocene polymers as a base polymer or component of the base polymer.

The inventions disclosed and claimed in commonly assigned U.S. Pat. No. 6,825,253 make use of lead containing fillers. European Patent Specification EP 1192624B1 discloses the well known concept that lead compounds are added to the insulating compositions for electric cables to prevent water trees, while also acknowledging the need to provide substantially lead-free insulation compositions for electric cables. EP 1192624B1 proposes the use of a specific elastomer terpolymer containing 5-vinyl-2-norbornene to provide an insulation composition substantially free of lead or its derivatives with satisfactory stability of dielectric strength over time along with resistance to the formation of water trees.

A need exists in the electrical cable industry for an additive system that improves the performance of lead-free filled insulation composition including those using metallocene polymers as a base polymer or component of the base polymer, without the use of special or custom polymers such as elastomer terpolymer containing 5-vinyl-2-norbornene as the base resin.

SUMMARY OF THE INVENTION

The invention provides an additive system that improves the performance of polymers when used as a lead-free filled insulation composition.

Specifically, the invention provides a lead-free insulation composition for electric cable comprising a base polymer comprising (a) a base polymer comprising either (i) at least one metallocene polymer, or (ii) at least one non-metallocene polymer or (iii) a combination thereof; (b) a filler; and (c) an additive comprising either (i) at least one hindered amine light stabilizer, or (ii) at least one mercapto compound, or (iii) a combination thereof; wherein no ingredients containing substantial amounts of lead have been added to said composition. An amine antioxidant may also be added to the composition of the invention as a further additive.

As stated above, in embodiments of the invention the base polymer comprises at least one non-metallocene polymer. In other embodiments of the invention, the insulation composition base polymer comprises at least one metallocene polymer. In further embodiments of the invention, the base polymer comprises at least one non-metallocene polymer and at least one metallocene polymer. Specifically, in embodiments of the invention, the base polymer may comprise 20% to 99% by weight metallocene polymer and 1% to 80% by weight non-metallocene polymer, and the additive may be from about 0.25% to about 2.5% by weight of said insulation composition, preferably from about 0.5% to about 1.5% by weight of said insulation composition.

BRIEF DESCRIPTION OF THE DRAWINGS

FIG. 1 shows IRK Values for a composition according to the invention in comparison to a composition not in accordance with the invention.

FIG. 2 shows SIC values for a composition according to the invention in comparison to a composition not in accordance with the invention.

DETAILED DESCRIPTION OF THE INVENTION

The invention particularly relates to polymeric compositions utilizing polyolefins, which compositions have a unique combination of good mechanical properties, good dielectric properties, and good water treeing resistance, as well as a lower melt temperature for improved processability when the compositions include peroxide-containing compounds. The products are extremely useful as lead-free insulation compositions for electric power cables.

In this description the expression "lead-free" can be considered synonymous with "substantially lead-free" and means that lead-containing substances are not added to the compositions and/or insulations of the invention or the cables that use them. The reality must be recognized, however, that trace or negligible amounts of lead or its derivatives or compounds may be present in the constituent materials that make up the insulation composition and the terms "lead-free" and "substantially lead-free" do not exclude this possible presence of trace or negligible amounts. In any event, "lead-free" and "substantially lead-free" can be taken to mean no more than 500 ppm lead in the insulation composition.

The polymers utilized in the protective jacketing, insulating, conducting or semiconducting layers of the inventive cables of the invention may be made by any suitable process which allows for the yield of the desired polymer with the desired physical strength properties, electrical properties, tree retardancy, and melt temperature for processability.

The base polymer in accordance with the invention may comprises either at least one non-metallocene polymer, at least one metallocene polymer or at least one non-metallocene polymer and at least one metallocene polymer.

Metallocene polymers are produced using a class of highly active olefin catalysts known as metallocenes, which for the purposes of this application are generally defined to contain one or more cyclopentadienyl moiety. The manufacture of metallocene polymers is described in U.S. Pat. No. 6,270,856 to Hendewerk, et al, the disclosure of which is incorporated by reference in its entirety.

Metallocenes are well known especially in the preparation of polyethylene and copolyethylene-alpha-olefins. These catalysts, particularly those based on group IV transition metals, zirconium, titanium and hafnium, show extremely high activity in ethylene polymerization. Various forms of the catalyst system of the metallocene type may be used for polymerization to prepare the polymers used in this invention, including but not limited to those of the homogeneous, supported catalyst type, wherein the catalyst and cocatalyst are together supported or reacted together onto an inert support for polymerization by a gas phase process, high pressure process, or a slurry, solution polymerization process. The metallocene catalysts are also highly flexible in that, by manipulation of the catalyst composition and reaction conditions, they can be made to provide polyolefins with controllable molecular weights from as low as about 200 (useful in applications such as lube-oil additives) to about 1 million or higher, as for example in ultra-high molecular weight linear polyethylene. At the same time, the MWD of the polymers can be controlled from extremely narrow (as in a polydispersity of about 2), to broad (as in a polydispersity of about 8).

Exemplary of the development of these metallocene catalysts for the polymerization of ethylene are U.S. Pat. No. 4,937,299 and EP-A-0 129 368 to Ewen, et al., U.S. Pat. No. 4,808,561 to Welborn, Jr., and U.S. Pat. No. 4,814,310 to Chang, which are all hereby are fully incorporated by reference. Among other things, Ewen, et al. teaches that the structure of the metallocene catalyst includes an alumoxane, formed when water reacts with trialkyl aluminum. The alumoxane complexes with the metallocene compound to form the catalyst. Welborn, Jr. teaches a method of polymerization of ethylene with alpha-olefins and/or diolefins. Chang teaches a method of making a metallocene alumoxane catalyst system utilizing the absorbed water in a silica gel catalyst support. Specific methods for making ethylene/alpha-olefin copolymers, and ethylene/alpha-olefin/diene terpolymers are taught in U.S. Pat. No. 4,871,705 (issued Oct. 3, 1989) and U.S. Pat. No. 5,001,205 (issued Mar. 19, 1991) to Hoel, et al., and in EP-A-0 347 129 published Apr. 8, 1992, respectively, all of which are hereby fully incorporated by reference.

Other cocatalysts may be used with metallocenes, such as trialkylaluminum compounds or ionizing ionic activators, such as tri(n-butyl)ammonium tetra(pentafluorophenyl) boron, which ionize the neutral metallocene compound. Such ionizing compounds may contain an active proton or some other cation such as carbonium, which ionizing the metallocene on contact, forms a metallocene cation associated with (but not coordinated or only loosely coordinated with) the remaining ion of the ionizing ionic compound. Such compounds are described in EP-A-0 277 003 and EP-A-0 277 004, both published Aug. 3, 1988, and are herein fully incorporated by reference. Also, the polymers useful in this invention can be a metallocene catalyst component that is a monocylopentadienyl compound, which is activated by either an alumoxane or an ionic activator to form an active polymerization catalyst system. Catalyst systems of this type are shown by PCT International Publication WO92/00333, published Jan. 9, 1992, U.S. Pat. Nos. 5,096,867 and 5,055,438, EP-A-0 420 436 and WO91/04257 all of which are fully incorporated herein by reference. The catalyst systems described above may be optionally prepolymerized or used in conjunction with an additive component to enhance catalytic productivity.

As previously stated, metallocene catalysts are particularly attractive in making tailored ultra-uniform and super-random specialty copolymers. For example, if a lower density copolymer is being made with a metallocene catalyst such as very low density polyethylene, (VLDPE), an ultra-uniform and super random copolymerization will occur, as contrasted to the polymer produced by copolymerization using a conventional Ziegler-Natta catalyst. In view of the ongoing need for electrical cables having improved mechanical and dielectric properties and improved water treeing resistance, as well as the need to process these materials at temperatures low enough to allow scorch free processing, it would be desirable to provide products utilizing the high quality characteristics of polyolefins prepared with metallocene catalysts.

The base polymer utilized in the insulation composition for electric cable in accordance with the invention may also be selected from the group of polymers consisting of ethylene polymerized with at least one comonomer selected from the group consisting of $C_3$ to $C_{20}$ alpha-olefins and $C_3$ to $C_{20}$ polyenes. Generally, the alpha-olefins suitable for use in the invention contain in the range of about 3 to about 20 carbon atoms. Preferably, the alpha-olefins contain in the range of about 3 to about 16 carbon atoms, most preferably in the range of about 3 to about 8 carbon atoms. Illustrative non-limiting examples of such alpha-olefins are propylene, 1-butene, 1-pentene, 1-hexene, 1-octene and 1-dodecene.

Preferably, the polymers utilized in the cables of the invention are either ethylene/alpha-olefin copolymers or ethylene/alpha-olefin/diene terpolymers. The polyene utilized in the invention generally has about 3 to about 20 carbon atoms. Preferably, the polyene has in the range of about 4 to about 20 carbon atoms, most preferably in the range of about 4 to about 15 carbon atoms. Preferably, the polyene is a diene, which can be a straight chain, branched chain, or cyclic hydrocarbon diene. Most preferably, the diene is a non conjugated diene. Examples of suitable dienes are straight chain acyclic dienes such as: 1,3-butadiene, 1,4-hexadiene and 1,6-octadiene; branched chain acyclic dienes such as: 5-methyl-1,4-hexadiene, 3,7-dimethyl-1,6-octadiene, 3,7-dimethyl-1,7-octadiene and mixed isomers of dihydro myricene and dihydroocinene; single ring alicyclic dienes such as: 1,3-cyclopentadiene, 1,4-cylcohexadiene, 1,5-cyclooctadiene and 1,5-cyclododecadiene; and multi-ring alicyclic fused and bridged ring dienes such as: tetrahydroindene, methyl tetrahydroindene, dicylcopentadiene, bicyclo-(2,2,1)-hepta-2-5-diene; alkenyl, alkylidene, cycloalkenyl and cycloalkylidene norbornenes such as 5-methylene-2morbornene (MNB), 5-propenyl-2-norbornene, 5-isopropylidene-2-norbornene, 5-(4-cyclopentenyl)-2-norbornene, 5-cyclohexylidene-2-norbornene, and norbornene. Of the dienes typically used to prepare EPR's, the particularly preferred dienes are 1,4-hexadiene, 5-ethylidene-2-norbornene, 5-vinyllidene-2-norbornene, 5-methylene-2-norbornene and dicyclopentadiene. The especially preferred dienes are 5-ethylidene-2-norbornene and 1,4-hexadiene.

In preferred embodiments of the invention, the base polymer comprises metallocene EP, which is an EPR, an EPDM polymer, ethylene-butene, or ethylene-octene, all of which are prepared with metallocene catalysts. In further preferred embodiments of the invention, the base polymer may be metallocene EP alone, metallocene EP and at least one other metallocene polymer, or metallocene EP and at least one non-metallocene polymer as described below. In other preferred embodiments of the invention, a metallocene base polymer with at least one hindered amine light stabilizer and an amine antioxidant achieves the objects of the invention. As stated above, however, combinations of factors such as cost and availability of raw materials, especially metallocene base polymers, and end user requirements for certain environments may dictate certain compositions or cause certain embodiments to be preferred in certain circumstances which under other circumstances they might not be.

As an additional polymer in the base polymer composition, a non-metallocene base polymer may be used having the structural formula of any of the polyolefins or polyolefin copolymers described above. Ethylene-propylene rubber (EPR), polyethylene, polypropylene or ethylene vinyl acetates having a range of vinyl acetate content of from about 10% to about 40% may all be used in combination with the metallocene polymers in the base polymer to give other desired properties in the base polymer.

In embodiments of the invention, the insulation composition base polymer comprises 20% to 99% by weight metallocene polymer or polymers and 1% to 80% by weight non-metallocene polymer or polymers. The additive is present in amounts from about 0.25% to about 2.5% by weight of said composition, preferably from about 0.5% to about 1.5% by weight of said composition.

As described above, the additive in accordance with the invention may comprise at least one hindered amine light stabilizer, and optionally, an amine antioxidant. In further embodiments of the invention, the additive in accordance with the invention comprises at least two hindered amine light stabilizers. In further embodiments of the invention, the additive in accordance with the invention comprises at least two hindered amine light stabilizers and an amine antioxidant.

Any suitable hindered amine light stabilizer may be used in accordance with the invention, for example, Bis (2,2,6,6-tetramethyl-4-piperidyl) sebaceate (tinuvin 770); Bis 1,2,2,6, 6-tetramethyl-4-piperidyl) sebaceate+methyl 1,2,2,6,6-tetramethyl-4-piperidyl sebaceate (tinuvin 765); 1,6-Hexanediamine, N,N'-Bis (2,2,6,6-tetramethyl-4-piperidyl) polymer with 2,4,6 trichloro-1,3,5-triazine, reaction products with N-butyl 2,2,6,6-tetramethyl-4-piperidinamine (Chimassorb 2020); Decanedioic acid, Bis (2,2,6,6-tetramethyl-1-(octyloxy)-4-piperidyl)ester, reaction products with 1,1-dimethylethylhydroperoxide and octane (Tinuvin 123); Triazine derivatives (tinuvin NOR 371); Butanedioic acid, dimethylester 4 hydroxy-2,2,6,6-tetramethyl-piperidine ethanol (Tinuvin 622), 1,3,5-Triazine-2,4,6-triamine,N,N'''-[1,2-ethane-diyl-bis [[[4,6-bis-[butyl(1,2,2,6,6pentamethyl-4-piperdinyl)amino]-1,3,5-triazine-2-yl]imino]-3,1-propanediyl]] bis [N',N''-dibutyl-N',N''bis(2,2,6,6-tetramethyl-4-piperidyl) (Chimassorb 119). Chimassorb 944 LD and Tinuvin 622 LD are preferred hindered amine light stabilizers.

As stated above, optionally, any suitable amine antioxidant may be used in accordance with the invention, for example, 1,2-dihydro-2-2-4, trimethylquinoline (Agerite MA, Agerite D, Flectol TMQ), octylated diphenylamine (Agerite Stelite), diphenyl-p-phenylene-diamine (Agerite DPPD), 4,4'-di(1,1-dimethylbenzyl)-diphenylamine (Naugard 445), ethoxy-1,2-dihydro-2-2-4 trimethylquinoline (Santaflex AW), p,p'-dioctyldiphenylamine(Vanox 12), 2-tert-butylhydroquinone (Eastman TenoxTBHQ), N-(1,3-dimethyl butyl)-N'-phenyl-p-phenylene diamine (Vulcanox 4020), N-phenyl-N'isopropyl-p-phenylene diamine (Vulcanox 4010), p-phenylene diamine (Wingstay 100). 1,2-dihydro-2-2-4, Trimethylquinoline and diphenylamine-acetone reaction products are preferred amine antioxidants.

As described above, the composition in accordance with the invention may comprise at least mercapto compound either with or without at least one hindered amine light stabilizer, and optionally, with an amine antioxidant. Quite surprisingly the mercapto compounds function in manner similar to a HAL in that the electrical and mechanical properties of no-lead insulation compositions in accordance with the invention are dramatically improved by their presence. It has quite surprisingly been discovered that mercapto compounds do not show such positive results in the presence of lead, only in its absence.

Examples of mercapto compounds are methylmercaptobenzimidazole, Zinc 2 methylmercaptobenzimidazole (Vanderbilt Vanox ZMTI), zinc salts of 2-methylmercaptobenzimidazole, methyl-2-methylmercaptobenzimidazole, 2-mercaptotolulimidazole (Vanderbilt Vanox MTI), blends of 4 and 5 methylmercaptobenzimidazole (Bayer Vulcanox MB2), and blends of 4 and 5 zinc methylmercaptobenzimidazole (Bayer Vulcanox ZMB2).

The insulating composition of the invention is filled. An illustrative example of a suitable filler is clay, talc (aluminum silicate or magnesium silicate), magnesium aluminum silicate, magnesium calcium silicate, calcium carbonate, magnesium calcium carbonate, silica, ATH, magnesium hydroxide, sodium borate, calcium borate, kaolin clay, glass fibers, glass particles, or mixtures thereof. In accordance with the invention, the weight percent range for fillers is from about 10 percent to about 60 percent, preferably from about 20 to about 50 weight percent filler.

Other additives commonly employed in the polyolefin compositions utilized in the invention can include, for example, crosslinking agents, antioxidants, processing aids, pigments, dyes, colorants, metal deactivators, oil extenders, stabilizers, and lubricants.

All of the components of the compositions utilized in the invention are usually blended or compounded together prior to their introduction into an extrusion device from which they are to be extruded onto an electrical conductor. The polymer and the other additives and fillers may be blended together by any of the techniques used in the art to blend and compound such mixtures to homogeneous masses. For instance, the components may be fluxed on a variety of apparatus including multi-roll mills, screw mills, continuous mixers, compounding extruders and Banbury mixers.

After the various components of the composition are uniformly admixed and blended together, they are further processed to fabricate the cables of the invention. Prior art methods for fabricating polymer insulated cable and wire are well known, and fabrication of the cable of the invention may generally be accomplished any of the various extrusion methods.

In a typical extrusion method, an optionally heated conducting core to be coated is pulled through a heated extrusion die, generally a cross-head die, in which a layer of melted polymer is applied to the conducting core. Upon exiting the die, the conducting core with the applied polymer layer is passed through a heated vulcanizing section, or continuous vulcanizing section and then a cooling section, generally an elongated cooling bath, to cool. Multiple polymer layers may be applied by consecutive extrusion steps in which an additional layer is added in each step, or with the proper type of die, multiple polymer layers may be applied simultaneously.

The conductor of the invention may generally comprise any suitable electrically conducting material, although generally electrically conducting metals are utilized. Preferably, the metals utilized are copper or aluminum.

Test Procedures and Sample Preparation

Square 14 gauge copper conductor wires with 30 mils of insulation were extruded with a 20:1 LD Davis standard extruder and a crosshead die and cured in steam at 400° F. Eight to ten 25 inch samples of these insulated square conductor wires were placed in a 75° C. water bath and energized with 7500 volts. Time to short circuit was recorded.

The purpose of the square conductor is to create an electrical stress concentration at each corner and accelerate time to failure.

Square 14 gauge copper conductor wires with 30 mils of insulation were extruded with a 20:1 LD Davis standard extruder and a crosshead die and cured in steam at 400° F. The wires were prepared and tested in accordance with (ICEA) standard T-22-294. The purpose of this test is to monitor electrical stability over time on insulated wires immersed in water.

The following materials were used:
Antioxidants
Agerite TMQ/, Polymerized 1,2-dihydro-2,2,4-trimethylquinoline, Antioxidant, R.T. Vanderbilt Company, Inc., Norwalk, Conn.
Agerite Superflex, Diphenylamine-acetone reaction product, R.T. Vanderbilt Company, Inc., Norwalk, Conn.
Mercapto Compound
Vulcanox ZMB2, zinc methylmercaptobenzimidazole, Bayer Corp., Akron, Ohio.
Vanox DSTDP, Distearyl thiodipropionate, Secondary Antioxidant, R.T. Vanderbilt
TAHQ
Santovar TAHQ, 2,5-Di(tert-amyl)hydroquinone, A, Flexsys Amerikca L.P., Akron, Ohio
HALS
Chimassorb 81, 2-Hydroxy-4-n-octoxybenzophenone, Ciba Specialty Chemicals Corp., Tarrytown, N.Y.
Chimassorb 944 LD, Poly[[6-[(1,1,3,3-tetramethylbutyl)amino]-1,3,5-triazine-2,4-diyl], Ciba Specialty Chemicals Corp., Tarrytown, N.Y.
Tinuvin 622 LD, Dimethyl succinate polymer w/4-hydroxy-2,2,6,6,-tertramethyl-1-piperidineethanol, Ciba Specialty Chemicals Corp., Tarrytown, N.Y.
Tinuvin 783 FDL, 50% by wt Tinuvin 622 and 50% by wt Chimassorb 944, Light Stabilizer, Ciba Specialty Chemicals Corp., Tarrytown, N.Y.
Polymers
Vistalon 1703, Ethylene Propylene Diene Rubber, Polymer, 0.86 g/ml, ExxonMobil Chemical Company, Houston, Tex.
Vistalon 722, Ethylene Propylene Rubber, Polymer, 0.86 g/ml, ExxonMobil Chemical Company, Houston, Tex.
Engage 8200, Copolymer of Ethylene and Octene-1, Polymer, 0.87 g/ml, Dupont Dow Elastomers L. L. C., Wilmington, Del.
Exact 4006, Ethylene-Butene Copolymer, Polymer, 0.9 g/ml, ExxonMobil Chemical Company, Houston, Tex.
LDPE, Low-density Polyethylene, Polymer, 0.92 g/ml, Equistar Chemicals, LP, Houston, Tex.
Nordell 37221P Ethylene Propylene Diene Rubber, Polymer, Dow Chemical, Midland, Mi.
Filler
Polyfil, Chemically Treated Anhydrous Aluminum Silicate, Filler, Huber Engineered Materials, Macon, Ga.
Minor Ingredients
Recco 140, Paraffin Wax, Processing Aid, R.E. Carroll Inc., Trenton, N.J.
(Silane) A172-50G, 50% Vinyl-tris(2-methoxyethoxy) silane in a 50% elastomeric (EPDM), Coupling Agent, UA Rubber Specialty Chemical Sdn. Bhd., Bukit Mertajam. Malaysia
Zinc Oxide, Activator, U.S. Zinc Corp., Chicago, Ill.
DI-Cup, Dicumyl Peroxide, Cross-Linker, Hercules Incorporated, Wilmington, Del.

Lettered examples are comparative examples and numbered examples are examples in accordance with the invention.

FIG. 1 and FIG. 2 show the results of the round wire test. The Insulation Constant and Insulation Resistance remain stable for one year. Prior art formulations without lead would become unstable and short out on test within 3 months. The Comparative Examples and Examples of the invention in Table 1 show the improved heat resistance and electrical properties of the invention with Ethylene Propylene Diene Rubber and Ethylene Propylene Rubber.

TABLE 1

No Lead Filled Insulation Patent Data

| FORMULATION | A | B | 1 | C | D | 3 | 4 | 5 | 6 | 7 | 8 | 9 |
|---|---|---|---|---|---|---|---|---|---|---|---|---|
| Vistalon 1703 Zig Natta EPDM | 90.0 | 90.0 | 90.0 | | | | | | | | | |
| LDPE DYNH 1 Polyethylene | 20.0 | 20.0 | 20.0 | 20.0 | 20.0 | 20.0 | 20.0 | 20.0 | 20.0 | 20.0 | 20.0 | 20.0 |
| Polyfil WC Clay | 50.0 | 50.0 | 50.0 | 50.0 | 50.0 | 50.0 | 50.0 | 50.0 | 50.0 | 50.0 | 50.0 | 50.0 |
| Agerite D. TMQ | 1.5 | 1.5 | 0.8 | 1.5 | 1.5 | 0.8 | 0.8 | 0.8 | 0.8 | 0.8 | 0.8 | 0.8 |
| Paraffin Wax | 4.2 | 4.2 | 4.2 | 4.2 | 4.2 | 4.2 | 4.2 | 4.2 | 4.2 | 4.2 | 4.2 | 4.2 |
| A172 Silane | 0.8 | 0.8 | 0.8 | 0.8 | 0.8 | 0.8 | 0.8 | 0.8 | 0.8 | 0.8 | 0.8 | 0.8 |
| TRD-90P Red Lead | 5.4 | | | 5.4 | | | | | | | | |
| Azo 66 Zinc Oxide | 5.0 | | 5.0 | 5.0 | 5.0 | 5.0 | 5.0 | | | 5.0 | 5.0 | 5.0 |
| Vistalon 722 metallocene EPR | | | | | | | | | | 90.0 | | 90.0 |
| Nordell 3722IP Metallocene EPDM | | | | 90.0 | 90.0 | 90.0 | 90.0 | 90.0 | 90.0 | | 90.0 | |
| Chisorb228 | | | | | | | | | | | | |
| Chimasorb 944 | | | | | | | | | 0.8 | | | |
| Tinuvin 123 | | | | | | | | | | | | 0.8 |
| Tinuvin 783 | | | | | | | | | | 0.8 | 0.8 | |
| Tinivin 622LD | | 0.8 | | | 0.8 | 0.8 | 0.8 | | | | | |
| Santavar TAHQ | | | | | | 0.3 | | | | | | |
| Dicup Dicumyl Peroxide | 2.4 | 2.4 | 2.4 | 2.4 | 2.4 | 2.4 | 2.4 | 2.4 | 2.4 | | 2.4 | 2.4 |
| TOTAL | 179.3 | 168.9 | 174.0 | 179.3 | 173.9 | 174.3 | 174.0 | 169.0 | 169.0 | 171.6 | 174.0 | 174.0 |
| MDR state of cure | 14.0 | 12.0 | 22.0 | 21.0 | 22.0 | 19.0 | 17.0 | 20.0 | 19.0 | 17.0 | 17.0 | 17.3 |
| Elong retained 7 d @ 140 C. | 90.0 | 70.0 | 100.0 | 68.0 | 86.0 | 93.0 | 87.0 | 83.0 | 89.0 | 95.0 | 96.0 | 95.0 |
| Elong retained 7 d @ 150 C. | 50.0 | Brittle | 40.0 | 40.0 | Brittle | Brittle | 6.0 | 5.0 | 10.0 | Brittle | Brittle | Brittle |
| Initial TD at 140 C. | 1.3 | 1.0 | 1.0 | 1.3 | 1.9 | 1.4 | 2.0 | 1.4 | 1.4 | 1.3 | 1.3 | 1.1 |
| 3 wk aged at 140 C. TD | 1.4 | 0.8 | 0.7 | 2.2 | 1.5 | 1.4 | 1.1 | 0.8 | 1.5 | 0.9 | 1 | 1 |

The Comparative Examples and Examples of the invention in Table 2 show the improved heat resistance and electrical properties of the invention with Ethylene Octene and Ethylene Butene copolymers.

The Comparative Examples and Examples of the invention in Table 3 show the improved heat resistance and electrical properties of another embodiment of the invention with Ethylene Propylene Diene Rubber and Ethylene Propylene Rubber.

TABLE 2

| | E | F | G | 10 | 11 | 12 | 13 |
|---|---|---|---|---|---|---|---|
| Engage 8200 ethylene octane co polym | 90 | | | | 90 | 90 | 90 |
| LDPE | 20 | 20 | 20 | 20 | 20 | 20 | 20 |
| Polyfill WC clay filler | 50 | 50 | 50 | 50 | 50 | 50 | 50 |
| Parifin process aid | 2 | 2 | 2 | 2 | 2 | 2 | 2 |
| TRD90P | | 5.4 | 5.4 | | | | |
| EF(A172)-50 silane | 0.8 | 0.8 | 0.8 | 0.8 | 0.8 | 0.8 | 0.8 |
| Zinc oxide | | 5 | 5 | | | | |
| Agerite resn D TMQ | 1.5 | 1.5 | 0.8 | 0.8 | 1.5 | 0.8 | 0.8 |
| Tinuvin 622LD | | | | 0.8 | | 0.8 | 0.75 |
| Exact 4006 Ethylene butane copolymer | | 90 | 90 | 90 | | | |
| Chimasorb 944 FDL | 1.5 | | 0.8 | | | | |
| Santavar TAHQ | | | | | | | 0.3 |
| Dicup Dicumyl Peroxide | 2.4 | 2.4 | 2.4 | 2.4 | 2.4 | 2.4 | 2.4 |
| TOTAL | 178.6 | 177.1 | 166.8 | 166.8 | 166.7 | 166.8 | 167.05 |
| MDR state of cure | 6.6 | 10.7 | 12.41 | 13.99 | 10.45 | 11.16 | 11.16 |
| Elong retained 7 d @140 C. | 105 | 97 | 92 | 85 | 91 | 86 | 85 |

TABLE 2-continued

|  | E | F | G | 10 | 11 | 12 | 13 |
|---|---|---|---|---|---|---|---|
| Elong retained 7 d @150 C. | 7 | 70 | 6 | 11 | 9 | 9 | 7 |
| Initial TD at 140 C. | 3.6 | 1.25 | 1.18 | 1.6 | 1.6 | 1.54 | 1.6 |
| 3 wk aged at 140 C. TD | 8.7 | 1.3 | 0.9 | 0.93 | 1.3 | 0.99 | 1 |

TABLE 3

|  | H | I | 14 | 15 |
|---|---|---|---|---|
| LDPE DYNH 1 Polyethylene | 20.0 | 20.0 | 20.0 | 20.0 |
| Polyfil WC Clay | 50.0 | 50.0 | 50.0 | 50.0 |
| Agerite D. TMQ | 0.5 | 0.8 | 1.5 | 1.0 |
| Paraffin Wax | 4.2 | 4.2 | 4.2 | 4.2 |
| TRD-90P Red Lead | 5.4 | 5.4 |  |  |
| A172 Silane | 0.8 | 0.8 | 0.8 | 0.8 |
| Azo 66 Zinc Oxide | 5.0 | 5.0 | 5.0 | 5.0 |
| Nordell 3722IP Metallocene EPDM | 90.0 | 90.0 | 90.0 |  |
| Vistalon 722 metallocene EPR |  |  |  | 90.0 |
| ZMB-2 | 1.0 | 1.0 | 1.0 | 1.5 |
| Agerite superflex |  | 0.5 | 0.5 | 1.0 |
| Dicup Dicumyl Peroxide | 2.4 | 2.4 | 2.4 |  |
| TOTAL | 179.3 | 180.1 | 175.4 | 173.5 |
| MDR state of cure | 16 | 13 | 10 | 11 |
| Elong retained 7 d @140 C. | 65 | 85 | 100 | 100 |
| Elong retained 7 d @150 C. | 1 | 30 | 85 | 84 |
| Initial TD at 140 C. | 1.7 | 2 | 1.9 | 1.9 |
| 3 wk aged at 140 C. TD | 1.5 | 1.7 | 1.5 | 1.1 |

The Comparative Examples and Examples of the invention in Table 4 show the improved electrical life of insulation materials of the invention with square wire test data. The purpose of the square conductor is to create an electrical stress concentration at each corner and accelerate time to failure by water tree growth. Table 4 also shows that the state of cure (MDR) is improved in the embodiments of the invention shown therein, in particular, the use of a mercapto compound in a lead free insulation composition without the use of one or more HALs

TABLE 4

| Square Wire Time to Failure Data | J | K | L | M | N | O | 16 |
|---|---|---|---|---|---|---|---|
| Vistalon 1703P |  |  | 45 |  |  |  |  |
| Nordell 3722 |  |  |  |  |  | 45 | 45 |
| Vistalon 722 | 45 | 45 |  |  | 45 |  |  |
| Engage 8200 |  |  | 45 | 90 | 45 | 45 | 45 |
| Exact 4006 in bags | 45 | 45 |  |  |  |  |  |
| LDPE | 20 | 20 | 20 | 20.00 | 20.00 | 20.00 | 20.00 |
| Polyfill WC clay filler | 50 | 50 | 50 | 50.00 | 50.00 | 50.00 | 50.00 |
| Parifin process aid | 2 | 2 | 2 | 2.00 | 2.00 | 2.00 | 2.00 |
| TRD90P | 5.4 | 5.4 | 5.4 |  |  | 5.40 |  |
| EF (A172)-50 silane | 0.8 | 0.8 | 0.8 | 0.80 | 0.80 | 0.80 | 0.80 |
| Zinc oxide | 5 | 5 | 5 | 5.0 | 5.0 | 5.0 | 5.0 |
| Agerite resn D | 1.5 | 0.8 | 1.5 | 1.5 | 1.5 | 0.8 | 0.8 |
| Tinivum 622LD |  | 0.8 |  |  |  | 0.80 | 0.80 |
| Dicup Dicumyl Peroxide | 2.4 | 2.4 | 2.4 | 2.4 | 2.4 | 2.4 | 2.4 |
| TOTAL | 177.1 | 177.2 | 132.1 | 171.7 | 171.7 | 177.2 | 171.8 |

| sample # | ED383B | ED383E | Control | KD6A | ED375B | A43 | 4728A44 |
|---|---|---|---|---|---|---|---|
| 1 | 711 | 711 | 1397 | 110 | 142 | 1409 | 1248 |
| 2 | 769 | 1116 | 1463 |  | 161 | 1525 | 2542 |
| 3 | 1061 | 1242 | 1477 |  | 273 | 1662 | 2557 |
| 4 | 1068 | 1267 | 1640 |  |  | 1795 | 2557 |
| 5 | 1085 | 1295 | 1943 |  |  | 1958 | 5537 |
| 6 | 1242 | 1397 | 2184 |  |  | 2114 | 5902 |
| 7 | 1242 | 1397 | 2723 |  |  | 2301 | 5902 |
| 8 | 1691 | 1397 | 2799 |  |  | 2543 | 5902 |
| 9 | 1753 | 1694 | 2871 |  |  | 2692 | 6167 |
| 10 | 1875 | 1699 | 2898 |  |  | 3235 | 6303 |

The following Tables list the data used in compiling FIGS. 1 and 2.

SIC Data EI 4728 A44 (80 v/mil) (Example 16 in accordance with the Invension)

| Date | SIC1 | SIC2 | SIC3 | Average SIC |
|---|---|---|---|---|
| Aug. 11, 2004 | 2.88 | 2.88 | 2.89 | 2.89 |
| Aug. 17, 2004 | 3.04 | 3.04 | 3.05 | 3.04 |
| Aug. 24, 2004 | 3.13 | 3.12 | 3.13 | 3.13 |
| Aug. 31, 2004 | 3.17 | 3.16 | 3.16 | 3.16 |
| Sep. 14, 2004 | 3.17 | 3.16 | 3.17 | 3.17 |
| Oct. 5, 2004 | 3.23 | 3.22 | 3.22 | 3.22 |
| Nov. 2, 2004 | 3.15 | 3.17 | 3.15 | 3.16 |
| Nov. 30, 2004 | 3.19 | 3.19 | 3.17 | 3.18 |
| Dec. 28, 2005 | 3.18 | 3.18 | 3.16 | 3.17 |
| Jan. 25, 2005 | 3.26 | 3.25 | 3.21 | 3.24 |
| Feb. 22, 2005 | 3.27 | 3.25 | 3.22 | 3.25 |
| Mar. 22, 2005 | 3.17 | 3.17 | 3.14 | 3.16 |
| Apr. 19, 2005 | 3.26 | 3.23 | 3.19 | 3.23 |
| May 17, 2005 | 3.17 | 3.20 | 3.13 | 3.17 |
| Jun. 14, 2005 | 3.18 | 3.17 | 3.14 | 3.16 |
| Jul. 12, 2005 | 3.18 | 3.16 | 3.12 | 3.15 |
| Aug. 9, 2005 | 3.17 | 3.16 | 3.10 | 3.14 |

IR Data for EI 4728 A43 (Comparative Example O)

| Date | IR1 | IR2 | IR3 | Average IR | IRK |
|---|---|---|---|---|---|
| Aug. 11, 2004 | 1900 | 1800 | 1800 | 1633 | 4723 |
| Aug. 17, 2004 | 1700 | 1600 | 1600 | 1700 | 4379 |
| Aug. 24, 2004 | 1700 | 1700 | 1700 | 1700 | 4379 |
| Aug. 31, 2004 | 1700 | 1700 | 1500 | 1633 | 4208 |
| Sep. 14, 2004 | 1800 | 1800 | 2200 | 1933 | 4961 |
| Sep. 21, 2004 | 1600 | 1500 | 1500 | 1533 | 3950 |
| Sep. 28, 2004 | 1400 | 1400 | 1400 | 1400 | 3607 |
| Oct. 5, 2004 | 1400 | 1400 | 1400 | 1400 | 3607 |
| Oct. 12, 2004 | 1400 | 1400 | 1300 | 1367 | 3521 |
| Oct. 19, 2004 | 1400 | 1300 | 1300 | 1333 | 3435 |
| Oct. 26, 2004 | 1300 | 1300 | 1200 | 1267 | 3263 |
| Nov. 2, 2004 | 1300 | 1200 | 1200 | 1233 | 3177 |
| Nov. 9, 2004 | 1200 | 1200 | 1200 | 1200 | 3091 |
| Nov. 16, 2004 | 1200 | 1200 | 1100 | 1167 | 3005 |
| Nov. 23, 2004 | 1300 | 1200 | 1200 | 1233 | 3177 |
| Nov. 30, 2004 | 1000 | 1000 | 990 | 997 | 2568 |
| Dec. 7, 2004 | 1100 | 1100 | 1100 | 1100 | 2634 |
| Dec. 14, 2004 | 1100 | 1100 | 1000 | 1067 | 2748 |
| Dec. 21, 2004 | 1000 | 1000 | 1000 | 1000 | 2576 |
| Dec. 28, 2004 | 1100 | 1100 | 1100 | 1100 | 2834 |
| Jan. 4, 2005 | 1100 | 1200 | 1100 | 1133 | 2920 |
| Jan. 11, 2005 | 1100 | 1100 | 1100 | 1100 | 2634 |
| Jan. 18, 2005 | 1100 | 1000 | 970 | 1023 | 2636 |
| Jan. 25, 2005 | 970 | 990 | 980 | 980 | 2525 |
| Feb. 1, 2005 | 1000 | 950 | 920 | 957 | 2464 |
| Feb. 8, 2005 | 1000 | 960 | 990 | 990 | 2550 |
| Feb. 15, 2005 | 1000 | 970 | 970 | 960 | 2525 |
| Feb. 22, 2005 | 1000 | 1000 | 1000 | 1000 | 2576 |
| Mar. 1, 2005 | 970 | 950 | 940 | 953 | 2456 |
| Mar. 6, 2005 | 870 | 900 | 870 | 880 | 2267 |
| Mar. 15, 2005 | 970 | 970 | 950 | 963 | 2482 |
| Mar. 22, 2005 | 890 | 880 | 860 | 877 | 2258 |
| Mar. 29, 2005 | 1000 | 1000 | 970 | 990 | 2550 |
| Apr. 5, 2005 | 1100 | 1000 | 990 | 1030 | 2653 |
| Apr. 12, 2005 | 1200 | 1200 | 1200 | 1200 | 3091 |
| Apr. 19, 2005 | 940 | 960 | 930 | 943 | 2430 |
| Apr. 26, 2005 | 1100 | 1200 | 1100 | 1133 | 2920 |
| May 3, 2005 | 1100 | 1200 | 1100 | 1133 | 2920 |
| May 10, 2005 | 1500 | 1500 | 1400 | 1467 | 3778 |
| May 17, 2005 | 1100 | 1100 | 1100 | 1100 | 2834 |
| May 24, 2005 | 1400 | 1400 | 1400 | 1400 | 3607 |
| May 31, 2005 | 1100 | 1100 | 1100 | 1100 | 2834 |
| Jun. 7, 2005 | 1300 | 1300 | 1300 | 1300 | 3349 |
| Jun. 14, 2005 | 930 | 970 | 940 | 947 | 2439 |
| Jun. 21, 2005 | 1200 | 1200 | 1200 | 1200 | 3091 |
| Jun. 28, 2005 | 1300 | 1300 | 1300 | 1300 | 3349 |
| Jul. 5, 2005 | 1300 | 1400 | 1300 | 1333 | 3435 |
| Jul. 12, 2005 | 1300 | 1200 | 1200 | 1233 | 3177 |
| Jul. 19, 2005 | 1000 | 1000 | 90 | 993 | 2559 |
| Jul. 26, 2005 | 1100 | 1100 | 1100 | 1100 | 2834 |
| Aug. 2, 2005 | 1200 | 1100 | 1100 | 1133 | 2920 |
| Aug. 9, 2006 | 1000 | 1000 | 960 | 993 | 2559 |
| Aug. 16, 2005 | 1600 | 1500 | 1400 | 1500 | 3864 |
| Aug. 23, 2005 | 1300 | 1300 | 1200 | 1267 | 3263 |

IR Data for EI 4728 A44 (Example 16 in accordance with the Invention)

| Date | IR1 | IR2 | IR3 | Average IR | IRK |
|---|---|---|---|---|---|
| Aug. 11, 2004 | 1100 | 1100 | 1100 | 1100 | 2634 |
| Aug. 17, 2004 | 1100 | 1100 | 1100 | 1100 | 2634 |
| Aug. 24, 2004 | 1200 | 1300 | 1400 | 1300 | 3349 |
| Aug. 31, 2004 | 1200 | 1200 | 1200 | 1200 | 3091 |
| Sep. 14, 2004 | 1500 | 1500 | 1600 | 1533 | 3950 |
| Sep. 21, 2004 | 1300 | 1400 | 1400 | 1367 | 3521 |
| Sep. 28, 2004 | 1300 | 1300 | 1300 | 1300 | 3349 |
| Oct. 5, 2004 | 1400 | 1500 | 1500 | 1467 | 3778 |
| Oct. 12, 2004 | 1400 | 1500 | 1400 | 1433 | 3692 |
| Oct. 19, 2004 | 1400 | i500 | 1500 | 1467 | 3776 |
| Oct. 26, 2004 | 1600 | 1600 | 1700 | 1633 | 4208 |
| Nov. 2, 2004 | 1600 | 1600 | 1600 | 1800 | 4122 |
| Nov. 9, 2006 | 1500 | 1600 | 1600 | 1533 | 3950 |
| Nov. 16, 2004 | 1400 | 1400 | 1400 | 1400 | 3607 |
| Nov. 23, 2004 | 1800 | 1800 | 1800 | 1800 | 4637 |
| Nov. 30, 2004 | 1500 | 1600 | 1600 | 1567 | 4036 |
| Dec. 7, 2004 | 1700 | 1800 | 1800 | 1767 | 4551 |
| Dec. 14, 2004 | 1500 | 1500 | 1500 | 1500 | 3864 |
| Dec. 21, 2004 | 1400 | 1400 | 1400 | 1400 | 3607 |
| Dec. 28, 2004 | 1400 | 1500 | 1500 | 1467 | 3776 |
| Jan. 4, 2005 | 1600 | 1600 | 1600 | 1600 | 4122 |
| Jan. 11, 2005 | 1700 | 1700 | 1600 | 1667 | 4294 |
| Jan. 18, 2005 | 2000 | 2000 | 4500 | 2633 | 7299 |
| Jan. 25, 2005 | 1700 | 1800 | 1800 | 1767 | 4551 |
| Feb. 1, 2005 | 1700 | 1800 | 1800 | 1767 | 4551 |
| Feb. 8, 2005 | 1900 | 1900 | 2000 | 1933 | 4981 |
| Feb. 15, 2005 | 1800 | 1900 | 2000 | 1900 | 4895 |
| Feb. 22, 2005 | 1800 | 1800 | 1900 | 1633 | 4723 |
| Mar. 1, 2005 | 1800 | 1800 | 1800 | 1600 | 4637 |
| Mar. 8, 2005 | 1600 | 1600 | 1700 | 1633 | 4208 |
| Mar. 15, 2005 | 1700 | 1700 | 1800 | 1733 | 4465 |
| Mar. 22, 2005 | 1500 | 1500 | 1700 | 1567 | 4036 |
| Mar. 29, 2005 | 1700 | 1700 | 1800 | 1733 | 4465 |
| Apr. 5, 2005 | 1600 | 1700 | 1800 | 1700 | 4379 |
| Apr. 12, 2005 | 1800 | 1900 | 2000 | 1900 | 4895 |
| Apr. 19, 2005 | 1700 | 1800 | 1900 | 1800 | 4637 |
| Apr. 26, 2005 | 2000 | 2000 | 2100 | 2033 | 5238 |
| May 3, 2005 | 2100 | 2100 | 2200 | 2133 | 5496 |
| May 10, 2005 | 2000 | 2000 | 2100 | 2033 | 5236 |
| May 17, 2005 | 1900 | 2000 | 2100 | 2000 | 5152 |
| May 24, 2005 | 1700 | 1800 | 1900 | 1600 | 4637 |
| May 31, 2005 | 2100 | 2100 | 2200 | 2133 | 5496 |
| Jun. 7, 2005 | 1900 | 2000 | 2100 | 2000 | 5152 |
| Jun. 14, 2005 | 1900 | 1900 | 2000 | 1933 | 4961 |
| Jun. 21, 2005 | 2100 | 2200 | 2200 | 2167 | 5582 |
| Jun. 28, 2005 | 2100 | 2100 | 2200 | 2133 | 5496 |
| Jul. 5, 2005 | 2000 | 2100 | 2200 | 2100 | 5410 |
| Jul. 12, 2005 | 2100 | 2200 | 2300 | 2200 | 5667 |
| Jul. 19, 2005 | 1800 | 1900 | 1900 | 1867 | 4809 |
| Jul. 26, 2005 | 1700 | 1800 | 1900 | 1800 | 4837 |
| Aug. 2, 2005 | 2000 | 2100 | 2300 | 2133 | 5496 |
| Aug. 9, 2005 | 1900 | 2000 | 2100 | 2000 | 5152 |
| Aug. 16, 2005 | 1800 | 1800 | 1900 | 1833 | 4723 |
| Aug. 23, 2005 | 1800 | 1900 | 2100 | 1933 | 4961 |

SIC Data for EI 4728 A43 (80 v/mil) (Comparative Example O)

| Date | SIC1 | SIC2 | SIC3 | Average SIC |
|---|---|---|---|---|
| Aug. 11, 2004 | 2.90 | 2.87 | 2.92 | 2.90 |
| Aug. 17, 2004 | 2.97 | 2.94 | 2.99 | 2.96 |
| Aug. 24, 2004 | 3.02 | 2.99 | 3.04 | 3.01 |
| Aug. 31, 2004 | 3.00 | 2.97 | 3.03 | 3.00 |
| Sep. 14, 2004 | 2.96 | 2.92 | 2.99 | 2.96 |
| Oct. 5, 2004 | 3.01 | 2.95 | 3.01 | 2.99 |
| Nov. 2, 2004 | 2.95 | 2.90 | 2.97 | 2.94 |
| Nov. 30, 2004 | 3.00 | 2.92 | 3.01 | 2.98 |
| Dec. 28, 2004 | 2.99 | 2.93 | 3.02 | 2.98 |
| Jan. 25, 2005 | 3.10 | 3.02 | 3.10 | 3.08 |
| Feb. 22, 2005 | 3.13 | 3.06 | 3.11 | 3.10 |
| Mar. 22, 2005 | 3.10 | 3.04 | 3.09 | 3.08 |
| Apr. 19, 2005 | 3.17 | 3.09 | 3.16 | 3.14 |
| May 17, 2005 | 3.13 | 3.02 | 3.11 | 3.09 |
| Jun. 14, 2005 | 3.18 | 3.06 | 3.15 | 3.13 |
| Jul. 12, 2005 | 3.17 | 3.08 | 3.16 | 3.13 |
| Aug. 9, 2005 | 3.18 | 3.08 | 3.15 | 3.14 |

While the present invention has been described and illustrated by reference to particular embodiments thereof, it will be appreciated by those of ordinary skill in the art that the invention lends itself to variations not necessarily illustrated herein.

For this reason, then, reference should be made solely to the appended claims for the purposes of determining the true scope of this invention.

What is claimed is:

1. A lead-free insulation composition for electric cable comprising:
   (a) a base polymer comprising 20% to 99% by weight of a metallocene polymer and 1% to 80% by weight of a non-metallocene polymer;
   (b) a filler; and
   (c) an additive comprising
      (i) an antioxidant, and
      (ii) a hindered amine light stabilizer;
   wherein no ingredients containing substantial amounts of lead have been added to said composition.

2. An insulation composition according to claim 1 wherein said antioxidant is an amine antioxidant.

3. An insulation composition according to claim 1 wherein said at least one metallocene polymer is selected from the group consisting of metallocene EP, metallocene EPDM, metallocene ethylene-butene and metallocene ethylene-octene, and mixtures thereof.

4. An insulation composition according to claim 1 wherein said filler is a clay filler.

5. An insulation composition according to claim 1 wherein said composition contains less than about 500 parts per million by weight of lead.

6. An insulation composition according to claim 1 wherein said composition has an Insulation Constant and Insulation Resistance such that said composition does not become unstable and short out on test within 3 months or less.

7. An insulation according to claim 1 wherein no ingredients containing substantial amounts of zinc have been added to said composition.

8. An insulation composition according to claim 7 wherein said antioxidant is an amine antioxidant.

9. An insulation composition according to claim 7 wherein said at least one metallocene polymer is selected from the group consisting of metallocene EP, metallocene EPDM, metallocene ethylene-butene and metallocene ethylene-octene, and mixtures thereof.

10. An insulation composition according to claim 7 wherein said filler is a clay filler.

11. An insulation composition according to claim 7 wherein said composition contains less than about 500 parts per million by weight of lead.

12. A lead-free insulation composition for electric cable comprising:
   (a) a base polymer comprising 20% to 99% by weight of a metallocene polymer and 1% to 80% by weight of a non-metallocene polymer;
   (b) a filler; and
   (c) at least one hindered amine light stabilizer;
   wherein no ingredients containing substantial amounts of lead have been added to said composition.

13. An insulation composition according to claim 12 wherein said at least one metallocene polymer is selected from the group consisting of metallocene EP, metallocene EPDM, metallocene ethylene-butene and metallocene ethylene-octene, and mixtures thereof.

14. An insulation composition according to claim 12 wherein said at least one hindered amine light stabilizer is from about 0.25% to about 2.5% by weight of said composition.

15. An insulation composition according to claim 12 wherein said at least one hindered amine light stabilizer is from about 0.5% to about 1.5% by weight of said composition.

16. An insulation composition according to claim 12 wherein said filler is a clay filler.

17. An insulation composition according to claim 12 wherein said composition contains less than about 500 parts per million by weight of lead.

18. An insulation composition according to claim 12 wherein said composition has an Insulation Constant and Insulation Resistance such that said composition does not become unstable and short out on test within 3 months or less.

19. An insulation according to claim 12 wherein no ingredients containing substantial amounts of zinc have been added to said composition.

20. An insulation composition according to claim 19 wherein said at least one metallocene polymer is selected from the group consisting of metallocene EP, metallocene EPDM, metallocene ethylene-butene and metallocene ethylene-octene, and mixtures thereof.

21. An insulation composition according to claim 19 wherein said at least one hindered amine light stabilizer is from about 0.25% to about 2.5% by weight of said composition.

22. An insulation composition according to claim 19 wherein said at least one hindered amine light stabilizer is from about 0.5% to about 1.5% by weight of said composition.

23. An insulation composition according to claim 19 wherein said filler is a clay filler.

24. An insulation composition according to claim 19 wherein said composition contains less than about 500 parts per million by weight of lead.

* * * * *